United States Patent [19]

Kidoh et al.

[11] Patent Number: 4,501,870
[45] Date of Patent: Feb. 26, 1985

[54] FINE PARTICLES OF POLYVINYL CHLORIDE AND PROCESS FOR PRODUCING THE SAME

[75] Inventors: Kunizoh Kidoh; Hideki Wakamori; Fujio Suzuki; Takao Iwasaki, all of Iwaki, Japan

[73] Assignee: Kureha Kagaku Kogyo Kabushiki Kaisha, Tokyo, Japan

[21] Appl. No.: 614,223

[22] Filed: May 24, 1984

[30] Foreign Application Priority Data

May 24, 1983 [JP] Japan ................................. 58-91028

[51] Int. Cl.$^3$ ............................................. C08F 114/06
[52] U.S. Cl. .................................. 526/344.1; 524/297; 428/402
[58] Field of Search ..................... 524/297; 428/402; 526/344.1

[56] References Cited

U.S. PATENT DOCUMENTS

| | | | |
|---|---|---|---|
| 2,600,122 | 6/1952 | Meyer et al. | 524/297 |
| 3,475,398 | 10/1969 | Jobard | 526/344.1 |
| 3,725,325 | 4/1973 | Takeda et al. | 524/297 |
| 3,725,367 | 4/1973 | Kemp | 526/344.3 |
| 3,810,958 | 5/1974 | Takahashi et al. | 526/344.1 |
| 3,933,771 | 1/1976 | Eastman et al. | 524/297 |
| 4,145,499 | 3/1979 | Nagano et al. | 526/201 |

FOREIGN PATENT DOCUMENTS

| | | | |
|---|---|---|---|
| 2456131 | 1/1981 | France | 524/297 |
| 50-15830 | 2/1975 | Japan | 524/297 |
| 56-125443 | 10/1981 | Japan | 524/297 |
| 752265 | 7/1956 | United Kingdom | 526/344.1 |
| 769132 | 2/1957 | United Kingdom | 524/297 |
| 775825 | 5/1957 | United Kingdom | 524/297 |
| 1011961 | 12/1965 | United Kingdom | 524/297 |
| 1396348 | 6/1975 | United Kingdom | . |
| 441267 | 8/1974 | U.S.S.R. | 524/297 |

Primary Examiner—Joseph L. Schofer
Assistant Examiner—N. Sarofim
Attorney, Agent, or Firm—Wenderoth; Lind & Ponack

[57] ABSTRACT

Fine particles of polyvinyl chloride produced by bulk polymerization which comprise substantially discrete spherical particles with particle sizes of 0.2 to 2 microns, a plastisol prepared by adding 80 parts by weight of dioctylphthalate to 100 parts by weight of said particles having a viscosity of 50,000 centipoise or less (measured by a B-type viscometer, No. 4 rotor, 12 rpm, 25° C.) and a process for producing the same which comprises subjecting vinyl chloride to bulk polymerization in the presence of a dispersing stabilizer under gentle stirring without causing sedimentation or agglomeration of the polymer particles formed, wherein polymerization is terminated at a polymerization yield of 5 to 30%.

2 Claims, 2 Drawing Figures

FINE PARTICLES OF POLYVINYL CHLORIDE AND PROCESS FOR PRODUCING THE SAME

BACKGROUND OF THE INVENTION

1. Technical Field

This invention relates to fine particles of polyvinyl chloride and a process for producing the same.

Plastisols and organosols of polyvinyl chloride (hereinafter sometimes referred to as PVC) are useful materials widely employed in various fields according to the methods of their use such as coating, slush molding, and dipping. In such applications, a PVC plastisol is required to have excellent viscosity characteristics such as low initial viscosity and no change in viscosity with elapse of time and excellent gelling characteristic. Also the product prepared therefrom is required to have excellent thermal stability, transparency and resistance to water.

A PVC plastisol is produced by dispersing particulate PVC in a plasticizer. In order to obtain a plastisol having excellent viscosity characteristics as mentioned above, it is desirable that the particulate PVC be constituted of particles which are all spherical with relatively large particle sizes and have an appropriate particle size distribution. These particles should also be closely packed.

In order to meet these requirements, it is considered necessary to produce a PVC comprising fine spherical particles of a particle size of less than 2 microns with small volume of voids which do not easily absorb a plasticizer at room temperature.

2. Prior Art

In the prior art, PVC generally employed for such uses has been produced according to the seed polymerization method by emulsion polymerization and the microsuspension method. However, the former method is cumbersome in its polymerization operations and control of the polymerization is difficult. Furthermore, the reproducibility is poor. On the other hand, the latter method has certain advantages such as the ease with which the particle sizes and their distribution can be controlled and the great degree of freedom in the choice of the emulsifier but also has a disadvantage in that a homogenizer of high pressure and high shearing force is required. A disadvantage common to these methods is that, since the polymer is formed as an aqueous dispersion, no particulate product can be obtained without recourse to a measure such as spray drying. The total energy cost necessary for removal of water or drying must be considered as a great problem in these days when the cost of fuel is ever increasing.

In this connection, it is to be remembered that there is a bulk polymerization method for production of PVC. According to this method, since the PVC formed is obtained as a dispersion in the liquefied monomer, release of the pressure after polymerization will immediately give a dry particulate product, thus overcoming all of the problems as mentioned above. However, the particulate PVC produced according to the practically applied bulk polymerization method, although having the advantage of skinless property, is porous in nature and absorbs a plasticizer, which makes it unsuitable for use in plastisols.

Concerning this point, some assert that fine particles of PVC with particles sizes of 10 to 50 microns having a narrow particle distribution can be produced by the bulk polymerization and are useful for preparation of plastisols (as stated in Japanese Patent Publication No. 25863/1972 and Japanese Laid-open Patent Publication No. 26278/1973). However, perusal of these prior-art disclosures reveals that the PVC thus produced is used in combination with the PVC for a plastisol as conventionally produced for control of the viscosity of the plastisol formed.

It is also known to carry out bulk polymerization in the presence of a cellulose derivative (as described in Japanese Laid-open Patent Publication No. 137289/1978). However, this method belongs to the category of the conventional bulk polymerization method in which the polymerization system is stirred in a conventional manner, and it appears to be intended to obtain a bulk polymerized product with a single particle size by the presence of a cellulose derivative. In fact, according to a trace experiment we conducted, agglomeration of particles or secondary particle formation occurred under such conditions, whereby no PVC with low plasticizer absorbability could be obtained.

SUMMARY OF THE INVENTION

Our attention was drawn to the fact that the inner structure of the PVC particles obtained by the bulk polymerization method is constituted of a mass of agglomeration or secondary particles (disintegratable to primary particles by high shearing force under high temperature during processing kneading) with particles sizes of 3 to 10 microns comprising primary particles with particle size of 1 micron. On the basis of this observation, we have carried out investigations on the stability of a non-aqueous colloid of a solid (PVC)—liquid (vinyl chloride) during formation of particles of PVC from the point of view that PVC particles with small void volume suitable for plastisols might be obtained if the primary particles could be grown as they are without agglomeration. As a result, we have found that, by carrying out bulk polymerization while conducting appropriate stirring in the presence of a dispersing stabilizer, the primary particles can be grown without agglomeration up to a polymerization yield of about 30% to produce spherical particles with particle sizes of 2 microns or less, which are suitable for plastisols, the void volume being small.

Accordingly, the fine particles of polyvinyl chloride produced by bulk polymerization according to the present invention comprise substantially discrete spherical particles with particle sizes of 0.2 to 2 microns, and a plastisol prepared by adding 80 parts by weight of dioctylphthalate to 100 parts by weight of these particles has a viscosity of 50,000 centipoise or less (measured by a B-type viscometer, No. 4 rotor, 12 rpm, 25° C.).

The process according to this invention for producing the fine particles of polyvinyl chloride comprises subjecting vinyl chloride to bulk polymerization in the presence of a dispersion stabilizer under moderate stirring without causing sedimentation or agglomeration of the polymer particles formed, wherein polymerization is terminated at a polymerization yield of 5 to 30% thereby to obtain fine particles of polyvinyl chloride comprising substantially individual spherical particles with particle sizes of 0.2 to 2 microns, the plastisol prepared by adding 80 parts by weight of dioctylphthalate to 100 parts by weight of these particles having a viscosity of 50,000 centipoise or less (measured by a B-type viscometer, No. 4 rotor, 12 rpm, 25° C.)

According to the present invention, particulate PVC with small void volume can be obtained by bulk polymerization. It can be stated that the possibility of obtaining PVC particles suitable for plastisol according to such a polymerization system was completely unexpected in view of the fact that the bulk polymerization method of the prior art produced only porous PVC particles as described above. While the fine PVC particles are produced by the use of a dispersing stabilizer, this stabilizer is used only in a small amount, and therefore the particles are skinless in nature, and the plastisol prepared therefrom has excellent viscosity characteristics and gelling characteristic and at the same time has excellent thermal stability, transparency and resistance against whitening caused by attack by water.

The process of the present invention, which concerns bulk polymerization, of course involves no problem of energy consumption as in aqueous polymerization.

DETAILED DESCRIPTION OF THE INVENTION

PVC Fine Particles

Figure 1:
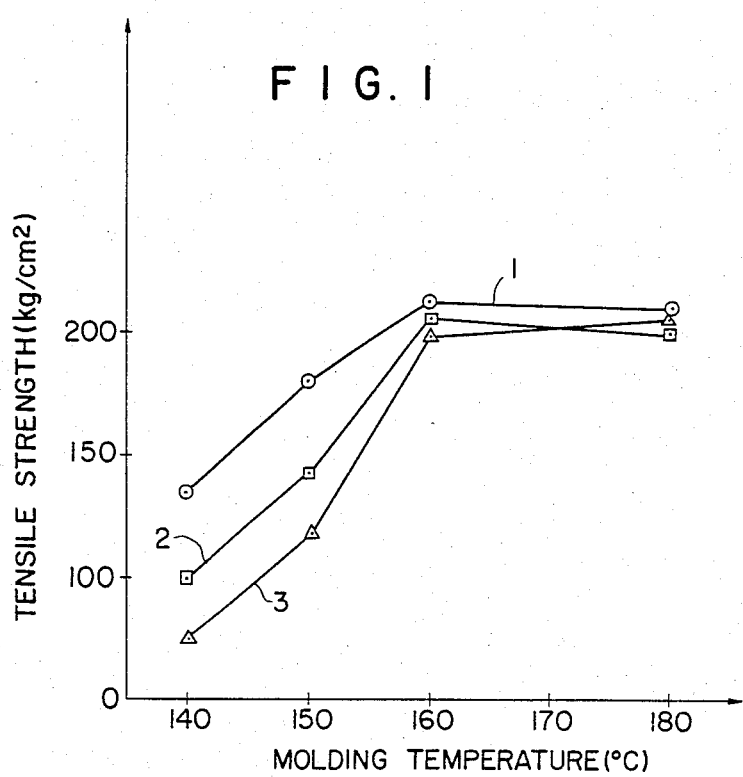
FIG. 1 and FIG. 2 are graphs respectively indicating relationships between tensile strength and molding temperature and relationships between tear strength and molding temperature obtained from the results of tests on plastisols respectively employing the PVC of Example 23 of the present invention (curve 1) and commercially available paste resins C (curve 2) and D (curve 3).

The term "polyvinyl chloride" used in this specification and the claims is meant to include, in addition to homopolymers of vinyl chloride, also copolymers of vinyl chloride and a comonomer copolymerizable therewith provided that the content of comonomer is 10 wt.% or less. Examples of such comonomers are vinyl acetate, acrylonitrile, acrylic acid and its ester, and methacrylic acid and its ester. Further, a small amount of crosslinking monomer may also be contained in the copolymer. Such polyvinyl chlorides as these are known in the art.

The PVC fine particles produced by bulk polymerization of the present invention comprise substantially discrete spherical particles with particle sizes of 0.2 to 2 microns. The wording "comprise substantially discrete spherical particles" used herein is intended to include cases, in addition to the case where the particles consist only of primary particles, where a group of particles is lightly agglomerated but can be disintegrated into primary particles by the application of a light external force, and also cases in addition to that of true spherical particles, those of spheres departing more or less from true spheres within the range inherent in the primary particles. Whether the particles of PVC produced by bulk polymerization are primary particles or not can be easily determined by observation through a microscope. Alternatively, those satisfying the condition with respect to plasticizer absorbability (as hereinafter described) may also be said to be primary particles.

Of the PVC particles of the present invention, substantially all, more specifically, 80 w.% or more of the all particles, must have particle sizes within the range of from 0.2 to 2 microns. With a particle size of greater than 2 microns, the speed of gelling is slower when the particles are formed by coating as plastisol. On the other hand, when it is smaller than 0.2 micron, the viscosity of plastisol may be undesirably high. The particle size of PVC can readily be measured by means of an electron microscope.

Distribution of particle sizes of the PVC particles of a given batch according to the present invention is within a relatively narrow range, and substantially all, more specifically, 80 wt.% or more of the all particles, are of a particular single particle size which of course is within the range of 0.2 to 2 microns. In the following, especially in Examples, the particular particle size given therein is of this nature. It is, however, within the scope of the present invention to modify the particle distribution so that the particles in a given batch are classified in two groups wherein at least 80% by weight of the particles of the first group have the same single particle size larger than the same single particle size that at least 80% by weight of the particles of the second group have, both the particle sizes being within the range of 0.2 to 2 microns.

The PVC particles of the present invention have the characteristic of low plasticizer absorption, and this feature can be exhibited by the viscosity of a plasticizer prepared by adding 80 parts by weight of dioctylphthalate to 100 parts by weight of the particles, which viscosity is 50,000 centipoise or less, preferably 30,000 centipoise or less (measured by a B-type viscometer, No. 4 rotor, 12 rpm, 25° C.). Those with a viscosity in excess of 50,000 centipoise are not suitable for the objects of the present invention because agglomerated particles not dispersible into discrete spheres in a plasticizer are contained in a large amount. In this connection, the PVC particles produced according to the bulk polymerization of the prior art absorbs most of the plasticizer under the same conditions and cannot become a sol-like paste.

Typical example of the PVC particles according to the present invention has an average degree of polymerization of 700 to 1800.

Preparation of PVC Fine Particles

The process for preparation of the PVC fine particles according to the present invention is not essentially different from the process conventionally employed or adopted for bulk polymerization of vinyl chloride, except for carrying out polymerization in the presence of a dispersing stabilizer under moderate stirring without causing sedimentation or agglomeration of polymer particles formed and terminating the polymerization at a polymerization yield of 5 to 30%, and also except for obtaining the PVC fine particles as described above.

(1) Monomer and Initiator

As will be apparent from the foregoing description, the wording "subjecting vinyl chloride to bulk polymerization" is not intended to restrict the monomer to only vinyl chloride, but the monomer to be used is also inclusive of a mixture of vinyl chloride with a small amount of comonomers copolymerizable therewith such as those exemplified hereinabove.

The polymerization initiator is preferably an oleophilic catalyst soluble in vinyl chloride and also in a comonomer optionally used, which can initiate bulk polymerization at about 20° to 70° C. In general, azo compounds and organic peroxides are suitable. More specifically, for example, azobisisobutyronitrile, azobisdimethylvaleronitrile, lauroyl peroxide, benzoyl peroxide, isopropylperoxydicarbonate, t-butylperoxypivalate, and cumylperoxyneodecanoate can be employed. These can be used also in combinations.

(2) Dispersion Stabilizer

The dispersing stabilizer which is generally suitable is a substance which can impart charges to the primary particles of PVC formed in bulk polymerization of vinyl chloride or can be absorbed thereby to form a protective layer. This should be soluble in vinyl chloride which is the dispersing medium and have adsorption capacity for the primary particles of PVC formed.

A preferable group of the dispersing stabilizer consists of surfactants, typically nonionic surfactants and anionic surfactants. These, particularly the latter, should be soluble in vinyl chloride. Examples of nonionic surfactants are polyoxyethylene alkyl ethers, polyoxyethylene phenyl or alkylphenyl ethers, polyoxyethyl fatty acid esters, polyoxyethylene sorbitan fatty acid esters, sorbitan fatty acid ester, polyoxyethylene-polyoxypropylene block polymers, (polyoxyethylene-polyoxypropylene)monoalkyl ethers, polyoxypropylene monoalkyl ethers, and polyoxypropylene fatty acid esters. Suitable anionic surfactants are, for example, higher alcohol sulfuric acid esters, alkylbenzene sulfonic acid, alkylsulfonic acid, alkylnaphthalene sulfonic acid, dialkylsulfosuccinic acid, polyoxyethylene sulfuric acid ester, polyoxyethylene alkyl ether phosphoric acid ester, polyoxyethylene alkylaryl ether phosphoric acid ester, alkylphosphoric acid ester, and metal salts thereof, particularly alkali metal (Na, K, etc.) salts, alkaline earth metal (Ca, Mg, etc.) salts, and salts of aluminum, zinc, iron, etc. Among these in view of their dispersion stabilizing capability and thermal stability of the product obtained from the plastisol prepared from the PVC fine particles formed, phosphoric acid esters such as polyoxyethylene alkyl ether phosphoric acid esters, polyoxyethylene alkylaryl ether phosphoric acid esters, alkylphosphoric acid esters, and alkali metal salts, alkaline earth metal salts and zinc salts thereof are preferred.

Another preferable group of dispersing stabilizers consists of polymeric protective colloids. The polymeric protective colloids should be soluble in vinyl chloride and have adsorption capacity for PVC primary particles. Typical examples of the polymeric protective colloids are copolymers of alkyl methacrylate (hereinafter abbreviated RMA) with acrylic acid, RMA with polyethylene (or polypropylene) glycol acrylate, RMA with methacrylic acid, RMA with polyethylene (or polypropylene) glycol methacrylate, RMA with vinyl pyrrolidone and RMA with methacrylic acid dialkylamide. Here, RMA is typically methyl, butyl or lauryl ester.

As the dispersion stabilizer, it is also possible to use a substance which is already specified for a specific use, such as a cleaning dispersant for prevention of sludge formation in a lubricant, provided that it is included within the above category or is effective for stabilizing the PVC primary particles in bulk polymerization of vinyl chloride in the spirit of the present invention.

The amount of the dispersion stabilizer should preferably be of the order of 0.01 to 1 part by weight per 100 parts by weight of the vinyl chloride employed. At a level lower than 0.01 part by weight, agglomeration of primary particles tends to occur during polymerization, whereby the polymerization yield cannot be increased. On the other hand, an amount in excess of one part will readily cause inconveniences in thermal stability and transparency in the PVC formed.

(3) Stirring

In the bulk polymerization according to the present invention, the stirring condition is important for prevention of agglomeration of the primary particles formed.

For removal of polymerization heat, stirring is necessary, but excessively vigorous stirring will result in firm agglomeration through vigorous collision mutually between the primary particles even in the presence of a dispersion stabilizer. On the other hand, if the stirring is excessively gentle, the primary particles will settle as sediment to also form agglomeration (removal of the polymerization heat will also become insufficient). As described above, once firm agglomeration of primary particles occurs, the agglomerate cannot be returned to primary particles, whereby the plastisol formed will be inferior in performance.

Accordingly, the stirring must be moderate enough so as not to cause sedimentation or agglomeration. Quantitative prescription of the degree of moderateness in this case is virtually impossible. Thus, the extent of stirring should be so determined that sedimentation or agglomeration of the PVC particles formed will not occur and that the PVC particles formed will satisfy the requirements concerning particle sizes and plasticizer absorbability.

In the present invention, because of the moderate stirring, removal of polymerization heat may sometimes be insufficient. In such a case, for removal of heat, a reflux system utilizing the vaporization latent heat of vinyl chloride, a cylindrical polymerization vessel with large cooling area or a continuous system in which PVC/vinyl chloride slurry flows in piston flow may be employed. The "stirring" mentioned in the present invention may be accomplished by any means provided that the required moderateness can be realized.

(4) Early Termination of Polymerization

In the present invention, it is necessary to terminate the bulk polymerization when the polymerization yields is 5 to 30%. Termination of the polymerization can be carried out by addition of a polymerization terminator, quenching of the polymerization system, or by some other suitable procedure.

The "polymerization yield" mentioned herein of course corresponds to the resin concentration of the PVC slurry formed in the case of a typical batchwise polymerization, but it should also be understood to be the resin concentration of the PVC slurry formed even in the case when the monomer is added afterwards during polymerization which will be described later.

(5) Polymerization Conditions and Other Particulars

The polymerization is carried out at a temperature necessary for decomposition of the given polymerization initiator and under a pressure which can maintain the liquid state of vinyl chloride at that temperature. The preferred polymerization temperature is generally of the order of 20° to 70° C.

Since the present invention is intended to obtain PVC with particle sizes of 0.2 to 2 microns, it is effective to increase the polymerization yield when it is desired to obtain PVC with greater sizes within this range. However, increase of the polymerization yield to a level higher than 30% will make the resin concentration of the PVC slurry too great, whereby agglomeration will be readily caused. Hence, when PVC particles with larger particle sizes are desired, it is necessary to carry out the operation so that the resin concentration of the PVC slurry formed will not exceed 30% by continuously adding vinyl chloride. In this case, a dispersion stabilizer and a catalyst may also be added together with the vinyl chloride.

It is not necessary to conduct the polymerization under the same conditions throughout the entire process. Accordingly, for example, larger particles may be formed in the presence of a dispersion stabilizer for forming larger particles such as, for example, polyoxyethylenealkylarylether phosphoric acid ester Mg salt, or dodecylbenzene sulfonic acid Zn salt and thereafter a dispersing stabilizer for forming smaller particles such as, for example, polyoxyethylenealkylarylether phosphoric acid ester Ca salt, or polypropyleneglycol monomethylether may be added to form a desired amount of smaller particles. Thus, when the PVC fine particles are obtained as a mixture with different particles sizes, they can readily assume the closest packing state within the PVC slurry formed, whereby the resin concentration in the slurry can be increased without causing agglomeration of particles. A mixture of large and small particles has an advantage of its own (as described in detail below), and the PVC fine particles of desired particle sizes for this purpose can be produced not only by the method as described above in the same polymerization vessel, but also by choosing the kinds of dispersion stabilizers and their amounts and by controlling the polymerization yield to obtain various kinds of products.

The polymerization degree of the PVC according to the present invention can be suitably set by controlling the polymerization temperature in a conventional manner according to bulk polymerization. For good performance of the PVC, an average degree of polymerization of the order of 700 to 1800 is ordinarily suitable.

After completion of the polymerization step, the PVC fine particles can be obtained by removing from the PVC slurry formed unpolymerized vinyl chloride under normal pressure or under reduced pressure or by filtration under pressurization. In the case of filtration under pressurization, for prevention of firm agglomeration between PVC primary particles, it is preferable to cool once the mixture to a temperature at which no agglomeration will occur. For the purpose of carrying out this operation more safely, it is possible to dilute the slurry by adding a hydrocarbon such as hexane which is soluble in vinyl chloride monomer but is a nonsolvent for PVC.

Utilization of PVC Fine Particles

The PVC fine particles according to the present invention is most preferably utilized for plastisols.

As plasticizers, those conventionally used for PVC are suitable. More specifically, examples are phthalic acid esters such as dioctyl phthalate, butylbenzyl phthalate, phosphoric acid esters such as tricresyl phosphate, dibasic fatty acid esters such as dibutyl sebacate, di-2-ethylhexyl adipate, epoxides such as epoxidized soybean oil, other polyester compounds and chlorinated paraffins.

The PVC particles suitable for plastisol may have single particle size, but it is preferably to use a mixture of a smaller particle size and a greater particle size for the purpose of obtaining a plastisol of lower viscosity. For example, a mixture of the PVC fine particles of the present invention with sizes of 0.5 to 2 microns and the PVC fine particles of the present invention with sizes of 0.2 to 0.5 micron mixed in a ratio of the order of 9:1 to 6:4 is suitable.

Such a plastisol can be formulated with diluents, thermal stabilizers or fillers at approximate proportions, as generally practiced in PVC plastisol.

The PVC fine particles of the present invention are particularly suitable for plastisol, but otherwise they can, of course, be utilized for organosol, plastigel and various other uses for which PVC can be applied.

EXPERIMENTAL EXAMPLES

EXAMPLES 1–15

After a stainless-steel autoclave of an inner volume of 10 liters equipped with a two-row paddle-type stirring blade as thoroughly purged with nitrogen gas, 7,000 g of vinyl chloride (VC), 7.0 g of butoxyethylperoxydicarbonate as the polymerization initiator and the dispersion stabilizers of the kinds and amounts as indicated in Table 1 were respectively introduced thereinto.

Then, in each case, polymerization reaction was carried out at an inner temperature of 51° C. while the mixture was stirred gently at a stirring rotational speed of 18 rpm. After 2 hours, polymerization was terminated by cooling to lower the inner temperature to −20° C. The contents of the autoclave were filtered and dried at 40° C. for 5 hours.

TABLE 1

| Example No. | Dispersion stabilizer | Amount added g/100 g VC | Remarks |
|---|---|---|---|
| 1 | Polyoxyethylene alkylaryl ether phosphoric acid ester sodium salt | 0.1 | An aqueous solution of "Plysurf A-208 B" produced by Daiichi Kogyo Seiyaku Kogyo Co. Japan, was neutralized and, to each, the corresponding metal chloride was added. The metal salt precipitate formed was separated by filtration. |
| 2 | Polyoxyethylene alkylaryl ether phosphoric acid ester sodium salt (calcium salt) | 0.02 | |
| 3 | Polyoxyethylene alkylaryl ether phosphoric acid ester sodium salt (magnesium salt) | 0.1 | |
| 4 | Polyoxyethylene alkylaryl ether phosphoric acid ester sodium salt (aluminum salt) | 0.1 | |
| 5 | Alkylsulfosuccinic acid sodium salt | 0.1 | "Pelex-OTP" produced by Kao Sekken Co., Japan. The same as above is converted to metal salt with corresponding metal chloride. |
| 6 | Alkylsulfosuccinic acid sodium salt (calcium salt) | 0.1 | |
| 7 | Alkylsulfosuccinic acid sodium salt (magnesium salt) | 0.1 | |
| 8 | Alkylsulfosuccinic acid sodium salt (zinc salt) | 0.1 | |

TABLE 1-continued

| Example No. | Dispersion stabilizer | Amount added g/100 g VC | Remarks |
|---|---|---|---|
| 9 | Dodecylbenzenesulfonic acid magnesium salt | 0.1 | "Neopelex - 06" produced by Kao Sekken Co., Japan, was converted to metal salt by the above method. |
| 10 | Dodecylbenzenesulfonic acid magnesium salt (zinc salt) | 0.1 | |
| 11 | Polypropyleneglycol monomethyl ether | 0.5 | "Newpole L B-625" produced by Sanyo Kasei Kogyo Co., Japan. |
| 12 | Polyethyleneglycolpolypropyleneglycol block polymer | 0.1 | "Newpole PE-61" produced by Sanyo Kasei Kogyo Co., Japan. |
| 13 | Polyoxyethylene distearate | 0.5 | "Ionet DS-300" produced by Sanyo Kasei Kogyo Co., Japan. |
| 14 | MMA/propyleneglycol methacrylate copolymer | 0.5 | Prepared by solution polymerization at charging ratio of 9/1 |
| 15 | MMA/methacrylic acid dialkylamide copolymer | 0.5 | Prepared by solution polymerization at charging ratio of 9/1 |

The polymers obtained were found to have a polymerization degree of about 1,100, and the polymerization yields were all within the range of from about 18 to 20%. Each polymer could be easily disintegrated into a fine powder and consisted of discrete spherical particles having uniform particle sizes substantially without agglomerated fusion of particles when observed by means of an electron microscope.

The results of measurement of the particle diameters of these PVC particles and viscosities of the plastisols prepared by adding 80 parts by weight of dioctyl phthalate to 100 parts by weight of each PVC and kneading the mixture are shown in Table 2. Although the particle sizes of the PVC particles differ depending on the kind and amount of the stabilizer used, each of them could be mixed with a plasticizer to produce a flowable sol. The sol viscosity is interrelated with the particle size and is lower with greater particle size.

TABLE 2

| Example No. | Particle size (μ) *1 | Plastisol viscosity *2 (c.p) |
|---|---|---|
| 1 | 0.62 | 7000 |
| 2 | 0.50 | 15000 |
| 3 | 0.85 | 2200 |
| 4 | 0.79 | 2600 |
| 5 | 0.52 | 14000 |
| 6 | 0.61 | 6900 |
| 7 | 0.81 | 2600 |
| 8 | 0.60 | 7300 |
| 9 | 0.72 | 4000 |
| 10 | 0.90 | 2000 |
| 11 | 0.39 | 29000 |
| 12 | 0.53 | 15000 |
| 13 | 0.42 | 29000 |
| 14 | 0.68 | 4200 |
| 15 | 0.60 | 6500 |

*1 by electron microscope.
*2 after kneading in a mortar for 15 minutes, measured by B-type viscometer (No. 4 rotor, 12 rpm, 25° C.), c.p. standing for centipoise.

COMPARATIVE EXAMPLE 1

Polymerization was carried out according to the procedure in Example 1 except that no dispersion stabilizer was added. About 20 minutes after initiation of polymerization, an abrupt temperature elevation occurred in the reactor, and the temperature control became difficult. Therefore, the polymerization reaction was terminated 40 minutes after initiation of polymerization by injecting a polymerization terminator and cooling. When the polymerization reactor was internally checked, polymers were found to be cohering in a mass or layers on the inner wall of the reactor, the stirring blade and shaft and the tip of temperature detector, and the presence of individual primary particles could not be confirmed as a result of observation under a microscope.

EXAMPLES 16-18, COMPARATIVE EXAMPLE 2

The polymerization and post-treatment were conducted according to the procedure in the polymerization of Example 3 except for changing of the stirring rotational speed to 5 rpm, 30 rpm, 100 rpm and 200 rpm. The properties of the polymer obtained, the plastisol viscosity when kneading 80 parts of DOP with 100 parts of the polymer and the situation within the autoclave are shown in Table 3.

TABLE 3

| Example No. | Stirring (rpm) | Polymerization yield (%) | State of particles* | Viscosity of plastisol (c.p.) |
|---|---|---|---|---|
| 16 | 5 | 20 | mixture of 0.85 μ discrete spheres and about 10μ agglomerated coarse particles | 3,000 |
| 3 | 18 | 19 | mostly 0.85μ discrete particles, substantially no agglomerated particle observed | 2,200 |
| 17 | 30 | 20 | same as in Example 3 | 2,500 |
| 18 | 100 | 21 | discrete spheres and much agglomerated particles observed; particle size 0.85μ | 30,000 |
| Comp. Exam. 2 | 200 | 19 | all agglomerated with some 10μ particle size, no discrete spheres | no sol formed |

* Most of the agglomerated particles in the Examples could be easily dispersed into discrete particles by kneading in DOP.

From Table 3, it can be seen that discrete spheres of 2μ or less of the present invention could be obtained under moderate stirring of 100 rpm or less, the plastisol viscosity being 30,000 centipoise. In Comparative Example 2, agglomerated particles were formd at a stirring speed of 200 rpm without formation of plastisol.

(For reference, suspension polymerization has ordinarily been conducted at a stirring speed of 300 to 600 rpm in this autoclave.)

EXAMPLES 19-20, COMPARATIVE EXAMPLE 3

Polymerization reaction was carried out according to the procedure in Example 3 except for changing of the polymerization time to 90 minutes, 150 minutes and 180 minutes. The polymerization yield, particle size, state of particles and the viscosity of plastisol obtained by kneading 80 parts of DOP with 100 parts of the polymer are set forth in Table 4.

TABLE 4

| Example No. | Polymerization time (min.) | Polymerization yield (%) | Particle size (μ) | State of particles* | Plastisol viscosity (c.p.) |
|---|---|---|---|---|---|
| 19 | 90 | 15 | 0.79 | discrete spheres of uniform sizes, no agglomerated particle observed | 2,500 |
| 3 | 120 | 19 | 0.85 | discrete spheres of uniform sizes, no agglomerated particle observed | 2,200 |
| 20 | 150 | 24 | 0.90 | discrete spheres of uniform sizes and much agglomerated particles observed | 4,000 |
| Comparative Example 3 | 180 | 35 | — | all agglomerated coarse particles, no discrete sphere observed | no sol formed |

*Most of the agglomerated particles in the Examples could be easily dispersed into discrete particles by kneading in DOP.

When the polymerization yield exceeded 30%, the amount of firmly agglomerated particles was increased, whereby flowability of the plastisol was extremely lowered.

EXAMPLE 21

Into the autoclave used in Example 3, 1,100 g of vinyl chloride, 1.1 g of cumylperoxyneodecanoate and 1.1 g of magnesium salt of alkylaryl polyoxyethylene ether phosphoric acid ester were charged, and polymerization was carried out at 44° C. Between 30 minutes and 330 minutes after initiation of polymerization, vinyl chloride was continuously injected at a rate of 22 g/min., and the reaction system was cooled 480 minutes after initiation of polymerization. The resulting polymer was recovered according to the procedure in Example 3. The amount of PVC obtained was 20% based on the total monomer charged. The particle size was found to be 1.15μ by observation with an electron microscope, no agglomeration between particles being observed. The viscosity of the plastisol after kneading 100 parts of PVC and 60 parts by weight of DOP was 12,000 c.p.

EXAMPLE 22

A polymer of a particle size of 1.15μ obtained in Example 21 (called A) and a polymer of a particle size of 0.35μ at a polymerization yield of 10% obtained similarly as in Example 2 except for changing the dispersion stabilizer to 0.1 g/100 g VC, using 2.0 g of cumylperoxyneodecanoate as the polymerization initiator and polymerizing at a polymerization temperature of 44° C. for 120 minutes (called B) were mixed in proportions as indicated in Table 5, and 100 parts of each of these mixtures was kneaded with 60 parts by weight of DOP to obtain plastisols having viscosities as shown in Table 5.

TABLE 5

| A (wt. %) | B (wt. %) | Plastisol viscosity (c.p.) |
|---|---|---|
| 100 | 0 | 12,000 |
| 90 | 10 | 5,400 |
| 80 | 20 | 4,200 |
| 70 | 30 | 4,600 |
| 60 | 40 | 6,100 |
| 0 | 100* | 50,000 or higher |

*The viscosity in the case of 80 parts of DOP was 45,000 c.p.

The plastisol viscosity is influenced by the particle size as shown in Table 2, the viscosity being lowered as the particle size becomes greater. Thus, in the case of a mixture of particles with relatively larger particle size and particles with relatively smaller particle size, a plastisol with low viscosity can be obtained.

EXAMPLE 23

Figure 2:
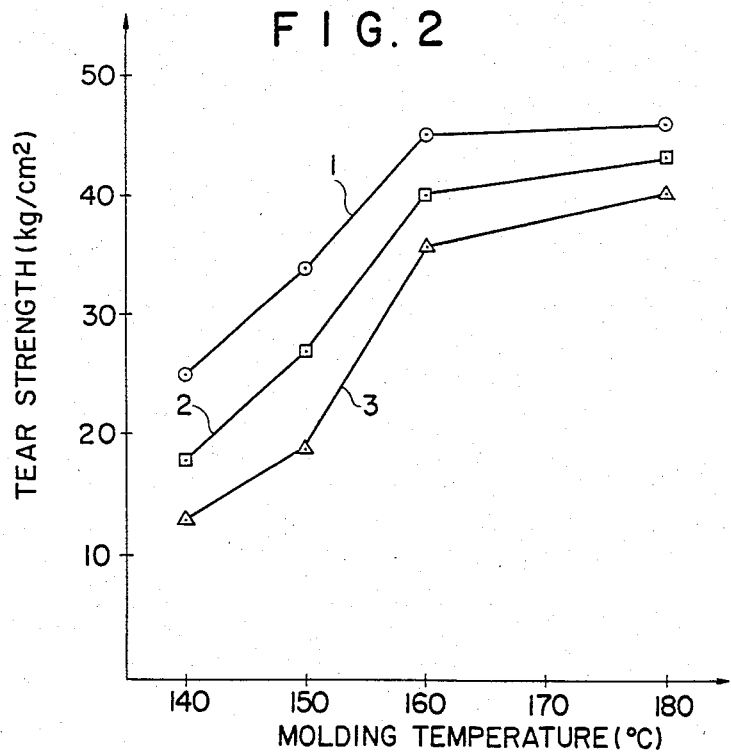

To 100 parts by weight of a mixture comprising 80 wt.% of the A polymer and 20 wt.% of the B polymer in Example 22 were added 2 parts by weight of a tin stabilizer (octyltin mercaptide, T-17 MOL, produced by Katsuta Kako Co., Japan), and the mixture was kneaded in a kneader for 10 minutes. The viscosity and the change in viscosity with elapse of time of the resultant plastisol were measured. This plastisol was also applied as a coating on a glass plate and heated in an oven at 180° C. for 15 minutes. The cast film thus obtained with a thickness of 1 mm was tested for thermal stability, transparency and water absorption. The test results are shown in Table 6. The test results for tensile strength and tear strength of cast films with a thickness of 1 mm obtained by heating the plastisol on a glass plate in an oven at 140° C., 150° C., 160° C. and 180° C., respectively, for 15 minutes are also shown in FIG. 1 and FIG. 2. Further, in these Figures, the test results are also shown for the commercially available resin for PVC paste C (polymerization degree $\overline{P}$=1,650, produced by the microsuspension method) and D (polymerization degree $\overline{P}$=1,650, produced by the emulsion polymerization seed method).

TABLE 6

| Resin | Plastisol viscosity (c.p.) Immediately after kneading | Plastisol viscosity (c.p.) 5 days later | Thermal stability (min.) | Water absorption (%) | Transparency Tp % | Transparency H % |
|---|---|---|---|---|---|---|
| Example 24 | 4,200 | 6,800 | 60 | 0.31 | 68.8 | 8.7 |
| Commercial C | 5,000 | 9,800 | 40 | 0.56 | 46.6 | 26.6 |
| Commercial D | 2,500 | 6,500 | 40 | 0.75 | 54.6 | 20.9 |

Measuring Methods (1) Plastisol viscosity: B-type viscometer, measured at 25° C., with No. 4 rotor, at 12 rpm.
(2) Thermal stability: Shown in terms of the time required until abrupt coloration into brown color when the cast film is heated in a Geer's oven at 190° C.

(3) Water absorption: Shown in terms of the weight gain when the cast film is dipped in water at 23° C. for 100 hours.

(4) Transparency: Five sheets of the cast films each of 1 mm thickness are superposed and subjected to measurement by a haze meter (Model TC-H-3, produced by Tokyo Denshoku Co., Japan).

(5) Tensile test:
  According to JIS K-6723-1969;
  Device: Tensilon produced by Tokyo Baldwin Co., Japan, UMT-1-500;
  Test piece: No. 3 Dumbell;
  Tensioning speed: 300 mm/min.
  Temperature: 23° C.

(6) Tearing test:
  According to JIS K-6732-1967;
  Device: the same as above;
  Test piece: rectangular;
  Tearing speed: 300 mm/min.
  Temperature: 23° C.

As will be apparent from the above results, the polymer obtained according to the present invention was found to involve a smaller change of the plastisol viscosity with elapse of time as compared with the commercially available resins and also to be improved in thermal stability, water absorption and transparency. Further, it cah be seen from FIG. 1 and FIG. 2 that the polymer resulting from the present invention (1) exhibits not only its tensile strength at a lower temperature during molding but also a high tear strength as compared with the commercial products (2) and (3), thus being excellent for practical applications.

We claim:

1. A process for producing fine particles of polyvinyl chloride, which comprises subjecting vinyl chloride to bulk polymerization in the presence of a dispersion stabilizer under gentle stirring without causing sedimentation or agglomeration of the polymer particles formed, wherein the polymerization is terminated at a polymerization yield of 5 to 30% thereby to obtain fine particles of polyvinyl chloride comprising substantially discrete spherical particles with particle sizes of 0.2 to 2 microns, which are characterized in that a plastisol prepared by adding 80 parts by weight of dioctyl phthalate to 100 parts by weight of said particles has a viscosity of 50,000 centipoise or less (measured by a B-type viscometer, No. 4 rotor, 12 rpm, 25° C.).

2. The process as claimed in claim 1 wherein the polymerization is conducted in two steps so that the first step is conducted to produce particles at least 80% by weight of which have the same single particle size which is larger than that at least 80% by weight of the particles produced in the second step will have, both the particle sizes being within the range of 0.2 to 2 microns.

* * * * *